US009747898B2

(12) United States Patent
Ng-Thow-Hing et al.

(10) Patent No.: US 9,747,898 B2
(45) Date of Patent: Aug. 29, 2017

(54) INTERPRETATION OF AMBIGUOUS VEHICLE INSTRUCTIONS

(71) Applicant: Honda Motor Co., Ltd., Tokyo (JP)

(72) Inventors: Victor Ng-Thow-Hing, Sunnyvale, CA (US); Karlin Bark, Menlo Park, CA (US); Cuong Tran, Santa Clara, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/465,049

(22) Filed: Aug. 21, 2014

(65) Prior Publication Data

US 2014/0365228 A1 Dec. 11, 2014

Related U.S. Application Data

(63) Continuation-in-part of application No. 13/832,918, filed on Mar. 15, 2013, now Pat. No. 9,164,281, and
(Continued)

(51) Int. Cl.
*G10L 15/22* (2006.01)
*G10L 15/20* (2006.01)
(Continued)

(52) U.S. Cl.
CPC .............. *G10L 15/20* (2013.01); *G02B 27/01* (2013.01); *G06F 3/013* (2013.01); *G06F 3/017* (2013.01);
(Continued)

(58) Field of Classification Search
CPC ....... G08G 1/167; G01C 21/365; G10L 15/22
See application file for complete search history.

(56) References Cited

U.S. PATENT DOCUMENTS

| 5,051,735 | A | | 9/1991 | Furukawa |
| 5,115,398 | A | | 5/1992 | De Jong |
| 5,368,309 | A | | 11/1994 | Monroe et al. |
| 5,440,428 | A | | 8/1995 | Hegg et al. |
| 5,519,536 | A | | 5/1996 | Hoehn |
| 5,737,712 | A | * | 4/1998 | Han ..................... F16H 61/0437 477/155 |

(Continued)

FOREIGN PATENT DOCUMENTS

| DE | 10130046 | 1/2003 |
| DE | 10131720 | 1/2003 |

(Continued)

OTHER PUBLICATIONS

Office Action of U.S. Appl. No. 13/832,918 issued May 8, 2015.
(Continued)

*Primary Examiner* — Paras D Shah
*Assistant Examiner* — Bryan Blankenagel
(74) *Attorney, Agent, or Firm* — Rankin, Hill & Clark LLP

(57) ABSTRACT

Various exemplary embodiments relate to a command interpreter for use in a vehicle control system in a vehicle for interpreting user commands, a vehicle interaction system including such a command interpreter, a vehicle including such a vehicle interaction system, and related method and non-transitory machine-readable storage medium, including: a memory and a processor, the processor being configured to: receive, from at least one human via a first input device, a first input having a first type; receive a second input having a second type via a second input device, wherein the second type comprises at least one of sensed information describing a surrounding environment of the vehicle and input received from at least one human; interpret both the first input and the second input to generate a system instruction; and transmit the system instruction to a different system of the vehicle.

19 Claims, 7 Drawing Sheets

Related U.S. Application Data a continuation-in-part of application No. 14/460,478, filed on Aug. 15, 2014, and a continuation-in-part of application No. 14/463,618, filed on Aug. 19, 2014.

(51) Int. Cl.
  *G06N 99/00* (2010.01)
  *G06F 3/01* (2006.01)
  *G02B 27/01* (2006.01)

(52) U.S. Cl.
  CPC ..... *G06N 99/005* (2013.01); *G02B 2027/014* (2013.01); *G02B 2027/0187* (2013.01)

(56) References Cited

U.S. PATENT DOCUMENTS

| | | | |
|---|---|---|---|
| 6,222,583 B1 | 4/2001 | Matsumura et al. | |
| 6,285,317 B1 | 9/2001 | Ong | |
| 6,574,555 B2 | 6/2003 | Mochizuki et al. | |
| 6,708,087 B2 | 3/2004 | Matsumoto | |
| 6,735,517 B2 | 5/2004 | Engelsberg et al. | |
| 6,774,772 B2 | 8/2004 | Hahn | |
| 6,947,064 B1 | 9/2005 | Hahn et al. | |
| 7,124,027 B1 | 10/2006 | Ernst | |
| 7,190,260 B2 | 3/2007 | Rast | |
| 7,216,035 B2 | 5/2007 | Hortner et al. | |
| 7,379,813 B2 | 5/2008 | Kubota | |
| 7,519,471 B2 | 4/2009 | Shibata et al. | |
| 7,565,230 B2 | 7/2009 | Gardner et al. | |
| 7,627,419 B2 | 12/2009 | Yoshida | |
| 7,647,170 B2 | 1/2010 | Sawaki et al. | |
| 7,783,422 B2 | 8/2010 | Tanaka | |
| 7,815,313 B2 | 10/2010 | Ito et al. | |
| 7,920,102 B2 | 4/2011 | Breed | |
| 8,135,536 B2 | 3/2012 | Matsunaga et al. | |
| 8,208,208 B2 | 6/2012 | Schwab | |
| 8,305,444 B2 | 11/2012 | Hada | |
| 8,352,181 B2 | 1/2013 | Hagiwara | |
| 8,358,224 B2 | 1/2013 | Seder et al. | |
| 8,406,990 B2 | 3/2013 | Barkowski et al. | |
| 8,411,245 B2 | 4/2013 | Lee et al. | |
| 8,457,827 B1* | 6/2013 | Ferguson | G05D 1/00 180/169 |
| 8,620,575 B2 | 12/2013 | Vogt et al. | |
| 8,633,810 B2 | 1/2014 | Luo et al. | |
| 8,633,979 B2 | 1/2014 | Szczerba et al. | |
| 8,660,735 B2 | 2/2014 | Tengler et al. | |
| 8,686,872 B2 | 4/2014 | Szczerba et al. | |
| 8,686,922 B2 | 4/2014 | Breed | |
| 8,725,342 B2 | 5/2014 | Ferguson et al. | |
| 2004/0193347 A1* | 9/2004 | Harumoto | B60T 8/1755 701/45 |
| 2005/0004723 A1* | 1/2005 | Duggan | G05D 1/0061 701/24 |
| 2005/0005308 A1* | 1/2005 | Logan | G06Q 30/06 725/135 |
| 2005/0071082 A1 | 3/2005 | Ohmura et al. | |
| 2005/0149251 A1* | 7/2005 | Donath | G01C 21/26 701/532 |
| 2005/0195383 A1 | 9/2005 | Breed et al. | |
| 2006/0116816 A1 | 6/2006 | Chao et al. | |
| 2006/0262140 A1 | 11/2006 | Kujawa et al. | |
| 2007/0038444 A1* | 2/2007 | Buck | B60R 16/0373 704/235 |
| 2007/0087756 A1 | 4/2007 | Hoffberg | |
| 2007/0185644 A1* | 8/2007 | Hirose | G01C 21/3626 701/532 |
| 2007/0288242 A1* | 12/2007 | Spengler | G10L 15/20 704/275 |
| 2008/0046150 A1 | 2/2008 | Breed | |
| 2008/0177541 A1* | 7/2008 | Satomura | 704/251 |
| 2008/0243337 A1* | 10/2008 | Tsuda | B60T 8/17557 701/41 |
| 2008/0318676 A1 | 12/2008 | Ham | |
| 2009/0005961 A1 | 1/2009 | Grabowski et al. | |
| 2009/0210257 A1 | 8/2009 | Chalfant et al. | |
| 2009/0268946 A1 | 10/2009 | Zhange et al. | |
| 2010/0027768 A1* | 2/2010 | Foskett | H04B 7/18506 379/88.14 |
| 2010/0131188 A1 | 5/2010 | Yeh et al. | |
| 2010/0192110 A1 | 7/2010 | Carter et al. | |
| 2010/0201894 A1 | 8/2010 | Nakayama et al. | |
| 2010/0253492 A1 | 10/2010 | Seder et al. | |
| 2010/0253541 A1 | 10/2010 | Seder et al. | |
| 2010/0253601 A1 | 10/2010 | Seder et al. | |
| 2010/0274480 A1* | 10/2010 | McCall | G01C 21/3664 701/408 |
| 2010/0280751 A1* | 11/2010 | Breed | G08G 1/161 701/414 |
| 2010/0292886 A1 | 11/2010 | Szczerba et al. | |
| 2010/0332266 A1 | 12/2010 | Tamir et al. | |
| 2011/0018903 A1 | 1/2011 | Lapstun et al. | |
| 2011/0022393 A1* | 1/2011 | Waller | G01C 21/3608 704/270 |
| 2011/0052042 A1 | 3/2011 | Ben Tzvi | |
| 2011/0055846 A1* | 3/2011 | Perez | G06F 3/017 719/313 |
| 2011/0075257 A1 | 3/2011 | Hua et al. | |
| 2011/0093190 A1 | 4/2011 | Yoon | |
| 2011/0093702 A1 | 4/2011 | Eom et al. | |
| 2011/0106428 A1 | 5/2011 | Park et al. | |
| 2011/0199376 A1 | 8/2011 | Saleman | |
| 2011/0251768 A1* | 10/2011 | Luo | B60W 30/12 701/70 |
| 2011/0301934 A1* | 12/2011 | Tardif | G06F 3/017 704/1 |
| 2011/0314381 A1* | 12/2011 | Fuller | G06F 3/017 715/727 |
| 2012/0019557 A1 | 1/2012 | Aronsson et al. | |
| 2012/0041632 A1 | 2/2012 | Bordes | |
| 2012/0072105 A1 | 3/2012 | Feyereisen et al. | |
| 2012/0083964 A1* | 4/2012 | Montemerlo | G05D 1/0214 701/26 |
| 2012/0109521 A1 | 5/2012 | Rothschild | |
| 2012/0154441 A1 | 6/2012 | Kim | |
| 2012/0162255 A1 | 6/2012 | Ganapathy et al. | |
| 2012/0173069 A1 | 7/2012 | Tsimhoni et al. | |
| 2012/0212405 A1 | 8/2012 | Newhouse et al. | |
| 2012/0224060 A1 | 9/2012 | Gurevich et al. | |
| 2012/0249575 A1 | 10/2012 | Gassner et al. | |
| 2012/0268351 A1 | 10/2012 | Sasaki et al. | |
| 2012/0283942 A1 | 11/2012 | T'Siobbel et al. | |
| 2012/0287284 A1* | 11/2012 | Jacobsen | G06F 1/163 348/158 |
| 2012/0296567 A1* | 11/2012 | Breed | G01C 21/26 701/468 |
| 2012/0310531 A1 | 12/2012 | Agarwal et al. | |
| 2013/0050258 A1 | 2/2013 | Liu et al. | |
| 2013/0083291 A1 | 4/2013 | Smithwick et al. | |
| 2013/0131907 A1* | 5/2013 | Green | G05D 1/0055 701/23 |
| 2013/0151145 A1 | 6/2013 | Ishikawa | |
| 2013/0158778 A1 | 6/2013 | Tengler et al. | |
| 2013/0261871 A1 | 10/2013 | Hobbs et al. | |
| 2013/0262997 A1 | 10/2013 | Markworth et al. | |
| 2013/0293582 A1 | 11/2013 | Ng-Thow-Hing et al. | |
| 2014/0005857 A1 | 1/2014 | Heisterkamp | |
| 2014/0019913 A1 | 1/2014 | Newman et al. | |
| 2014/0036374 A1 | 2/2014 | Lescure et al. | |
| 2014/0063064 A1 | 3/2014 | Seo et al. | |
| 2014/0114845 A1 | 4/2014 | Rogers et al. | |
| 2014/0121883 A1* | 5/2014 | Shen | B62D 15/0285 701/28 |
| 2014/0139524 A1 | 5/2014 | Nilsson et al. | |
| 2014/0267263 A1 | 9/2014 | Beckwith et al. | |
| 2014/0267398 A1 | 9/2014 | Beckwith et al. | |
| 2015/0226570 A1 | 8/2015 | Takei et al. | |

FOREIGN PATENT DOCUMENTS

| | | |
|---|---|---|
| DE | 102006008981 | 8/2007 |
| DE | 102012210145 | 7/2009 |

(56) References Cited

FOREIGN PATENT DOCUMENTS

| | | |
|---|---|---|
| DE | 102008040467 | 1/2010 |
| DE | 102008042734 | 4/2010 |
| DE | 102009045169 | 3/2011 |
| DE | 102012221762 | 6/2013 |
| EP | 1862988 | 11/2009 |
| EP | 2618108 | 7/2013 |
| JP | 2006309552 | 11/2006 |
| WO | 2010040589 | 4/2010 |
| WO | 2011108091 | 9/2011 |

OTHER PUBLICATIONS

Office Action of U.S. Appl. No. 13/832,209 dated Jul. 16, 2015, 37 pages.
Office Action of U.S. Appl. No. 13/832,209 dated Jan. 30, 2015, 26 pages.
Office Action of U.S. Appl. No. 14/041,614 dated Aug. 6, 2015, 21 pages.
http://www.carcoversdirect.com/car-lovers/resources/fact-friday/future-car-technologies/#.U3uVbP1dVJ1 (Accessed May 20, 2014).
Office Action of U.S. Appl. No. 14/321,105 dated Sep. 24, 2015, 37 pages.
Website: "BMW Technology Guide: Adaptive Brake Assistant" http://www.bmw.com/com/en/insights/technology/technology_guide/articles/adaptive_brake_assistant.html, printed Oct. 17, 2014.
Website: "Adaptive Cruise Control and Collision Warning with Brake Support" http://corporate.ford.com/doc/Adaptive_Cruise.pdf, Jul. 2012.
Article: Alves, P.R. et al. "Forward Collision Warning Systems Using Heads-up Displays: Testing Usability of Two New Metaphors", Intelligent Vehicles Symposium (IV), 2013 IEEE, pp. 1-6, http://ueeexplore/ieee.org/xpl/login.jsp?tp=&arnumber=6629438&url=htp%3A%2F%2ieeexplore.ieee.org%2Fstamp%2Fstamp.jsp%3Ftp%3E/026arnumber%3D6629438.
Article: Ho, C. et al. "Multisensory In-Car Warning Signals for Collision Avoidance" Human Factors: The Journal of the Human Factors and Ergonomics Society, 49(6), 1107-1114, Dec. 2007, http://www.ncbi.nlm.nih.gov/pubmed/18074709.
Article: Gray R. et al. "A Comparison of Different Informative Vibrotactile Forward Collision Warnings: Does the Warning Need to Be Linked to the Collision Event?", PloS One, 9(1), e87070, Jan. 27, 2014, http://www.plosone.org/article/info%3Adoi%2F10.1371%2Fjournal.pone.0087070.
Article: Tai et al. "Bridging the Communication Gap: A Driver-Passenger Video Link" dated Apr. 15, 2010, https://www.pervasive.wiwi.uni-due.de/uploads/tx_itochairt3/publications/Bridging_the_Communication_Gap-MC2009-GraceTai_01.pdf.
Office Action of U.S. Appl. No. 13/832,918 dated Jan. 2, 2015.
Office Action of U.S. Appl. No. 14/041,614 dated Dec. 23, 2014.
Autoblog, GM's Full-Windshield HUD Technology | Autoblog, YouTube, Mar. 17, 2010, http://www.youtube.com/watch?v=wR5EAGM4-U&feature=youtu.be&t=1m15s.
MVS California, 2_Working_Demo.mov, YouTube, May 16, 2011, http://www.youtube.com/watch?v=pdtcyaF6bTI.
Office Action of U.S. Appl. No. 14/041,614 dated May 6, 2015.
Search Report of DE Application No. 102014219575.6 dated Dec. 16, 2015, 12 pages.
Examination Report of DE Application No. 102014219575.6 dated Dec. 17, 2015, 10 pages.
Office Action of U.S. Appl. No. 14/041,614 dated Feb. 3, 2016, 45 pages.
Office Action of U.S. Appl. No. 14/460,478 dated Feb. 8, 2016, 70 pages.
Office Action of U.S. Appl. No. 14/463,618 dated Feb. 23, 2016, 58 pages.
Office Action of U.S. Appl. No. 14/856,596 dated Jan. 15, 2016, 36 pages.
Office Action of U.S. Appl. No. 14/321,105 dated Apr. 20, 2016, 37 pages.
Office Action of U.S. Appl. No. 14/460,478 dated Apr. 25, 2016, 18 pages.
Office Action of U.S. Appl. No. 14/321,105 dated Sep. 1, 2016, 29 pages.
Office Action of U.S. Appl. No. 14/856,596 dated Sep. 15, 2016, 33 pages.
Notice of Allowance of U.S. Appl. No. 15/162,836 dated Jul. 28, 2016, 32 pages.
Office Action of U.S. Appl. No. 14/321,105 dated Mar. 1, 2017, 26 pages.
Office Action of U.S. Appl. No. 14/515,620 dated Apr. 20, 2017, 31 pages.
Office Action of U.S. Appl. No. 14/856,596 dated Jan. 27, 2017, 26 pages.

* cited by examiner

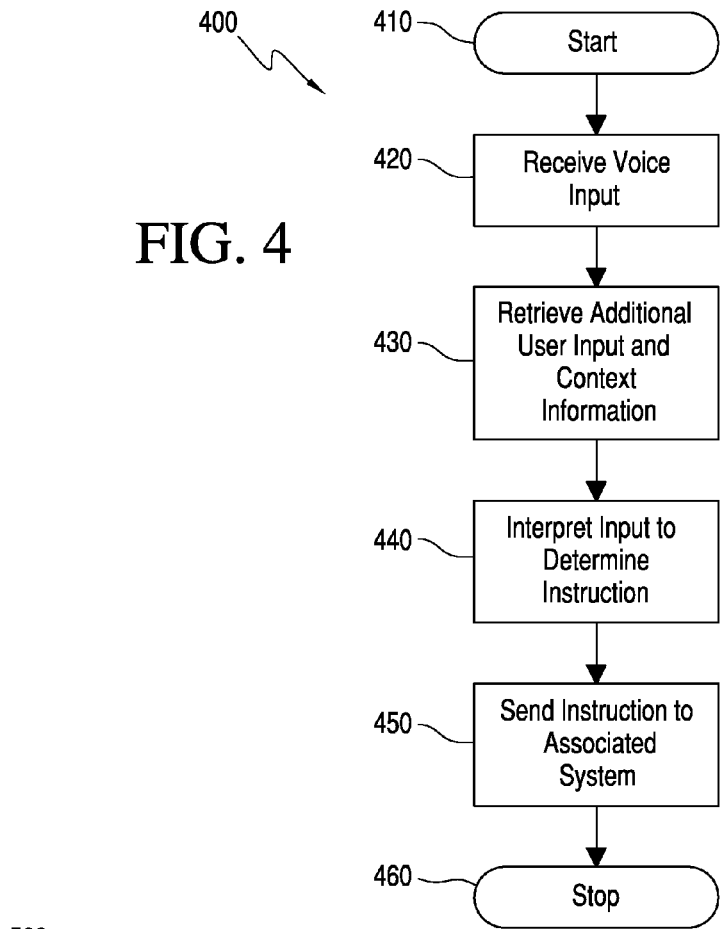

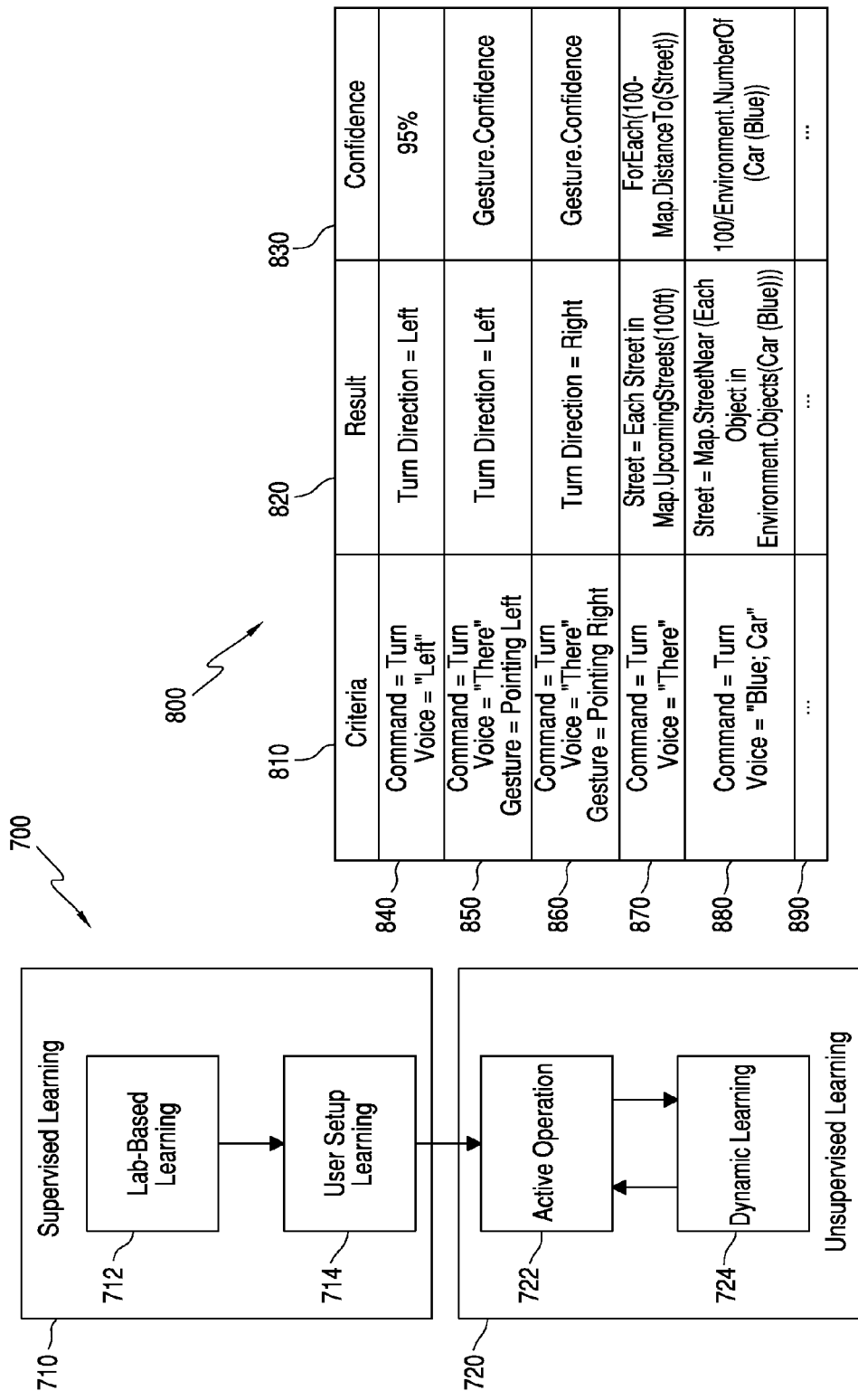

INTERPRETATION OF AMBIGUOUS VEHICLE INSTRUCTIONS

CROSS REFERENCE TO RELATED APPLICATIONS

This application claims priority as a continuation-in-part to U.S. patent application Ser. No. 13/832,918, filed on Mar. 15, 2013; Ser. No. 14/460,478, filed on Aug. 15, 2014; and Ser. No. 14/463,618, filed on Aug. 19, 2014, the entire disclosures of which are hereby incorporated herein by reference for all purposes.

TECHNICAL FIELD

Various exemplary embodiments disclosed herein relate generally to interpretation of user input and, more particularly but not exclusively, to interpretation of voice commands and gestures by a vehicle driver or passenger.

BACKGROUND

In recent years, voice control has seen increased adoption in many consumer products, including motor vehicles. Such systems have been used in contexts such as media and navigation control. For example a driver may utilize voice commands to select music to be played or a destination to which the navigation system may navigate. In the future, these voice recognition systems may be further utilized as a means for user control of other vehicle systems.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts which will follow in later sections.

Various embodiments described herein relate to a command interpreter for use in a vehicle control system in a vehicle for interpreting user commands, including: a memory and a processor, the processor being configured to: receive, from at least one of a human vehicle driver and a human vehicle passenger via a first input device, a first input having a first input type; receive a second input having a second input type different from the first input type via a second input device; interpret both the first input and the second input to generate a system instruction; and transmit the system instruction to a different system of the vehicle.

Various embodiments described herein relate to a vehicle interaction system for installation in a vehicle, the vehicle interaction system including: a first input system configured to receive a first input having a first input type from at least one of a human vehicle driver and a human passenger; a second input system configured to receive a second input having a second input type that is different from the first input type; an output system configured to accept instructions from other systems; a command interpreter configured to: receive the first input and the second input, interpret both the first input and the second input to generate an system instruction, and transmit the system instruction to the output system; and wherein a processor is configured to implement at least one of the first input system, the second input system, the output system, and the command interpreter.

Various embodiments described herein relate to a vehicle including: a first input system configured to receive a first input having a first input type from at least one of a human vehicle driver and a human passenger; a second input system configured to receive a second input having a second input type that is different from the first input type; an output system configured to accept instructions from other systems; a command interpreter configured to: receive the first input and the second input, interpret both the first input and the second input to generate an system instruction, and transmit the system instruction to the output system; and wherein a processor is configured to implement at least one of the first input system, the second input system, the output system, and the command interpreter.

Various embodiments described herein relate to a non-transitory machine-readable medium encoded with instructions for execution by a vehicle interaction system, the medium including: instructions for implementing a command interpreter, including: instructions for receiving, from at least one of a human vehicle driver and a human vehicle passenger via a first input device, a first input having a first input type; instructions for receiving a second input having a second input type different from the first input type via a second input device; instructions for interpreting both the first input and the second input to generate a system instruction; and instructions for transmitting the system instruction to a different system of the vehicle.

Various embodiments described herein relate to a method for interpreting vehicle user commands, the method including: receiving, from at least one of a human vehicle driver and a human vehicle passenger via a first input device, a first input having a first input type; receiving a second input having a second input type different from the first input type via a second input device; interpreting both the first input and the second input to generate a system instruction; and transmitting the system instruction to a different system of the vehicle.

Various embodiments are described wherein, in interpreting both the first input and the second input to generate a system instruction, the command interpreter is configured to: interpret the first input to identify a relevant portion of the second input; and interpret both the first input and the relevant portion of the second input to generate the system instruction.

Various embodiments are described wherein the system instruction includes a command and at least one parameter and, in interpreting both the first input and the second input to generate a system instruction, the command interpreter is configured to: determine the command based on the first input; and determine the parameter based on the second input Various embodiments are described wherein, in interpreting both the first input and the second input to generate a system instruction, the command interpreter is configured to utilize the second input to select from a plurality of potential instructions identified as being associated with the first input.

Various embodiments are described wherein, in interpreting both the first input and the second input to generate a system instruction, the command interpreter is configured to evaluate at least one rule of a plurality of rules correlating various inputs to various system instructions.

Various embodiments are described wherein the command interpreter is additionally configured to utilize machine learning to generate the plurality of rules.

Various embodiments are described wherein: the second input device is a camera; the command interpreter is configured to receive the second input from a gesture recognition system; and the second input describes a gesture performed by at least one of the human vehicle driver and the human passenger.

Various embodiments are described wherein: the command interpreter is configured to receive the second input from an environment sensing system that is configured to identify objects present in the environment outside of the vehicle; and the second input describes at least one object present in the environment outside the vehicle.

Various embodiments are described wherein the different system is an autonomous control system configured to control the motion of the vehicle.

Various embodiments are described wherein the instruction indicates a tactical maneuver for the autonomous control system to perform.

Various embodiments are described wherein the different system is a heads-up display positioned for viewing by at least one of the human vehicle driver and the human vehicle passenger and the instruction is associated with a graphic to be displayed via the heads-up-display.

BRIEF DESCRIPTION OF THE DRAWINGS

In order to better understand various exemplary embodiments, reference is made to the accompanying drawings, wherein:

FIG. 4 illustrates an exemplary method for interpreting user commands in accordance with aspect of the present application;

FIG. 5 illustrates an exemplary data arrangement for storing function metadata in accordance with aspect of the present application;

FIG. 7 illustrates an exemplary state diagram for enabling machine-based learning in a command interpreter in accordance with aspect of the present application;

FIG. 8 illustrates an exemplary data arrangement for storing command interpretation rules in accordance with aspect of the present application.

To facilitate understanding, identical reference numerals have been used to designate elements having substantially the same or similar structure or substantially the same or similar function.

DETAILED DESCRIPTION

While voice control systems offer a user-friendly and versatile approach to system control, humans are not always entirely precise when issuing such commands, leading to ambiguity in what was actually meant. In some such cases, the speaker may make reference to other information within the environment or may attempt to use non-verbal cues to communicate the entire intended message. For example, a passenger assisting with navigation of a vehicle may instruct the driver to "follow the blue car," which relies on the driver's ability to identify the blue car in the surrounding environment. As another example, the passenger may tell the driver to "turn onto that road" along with a finger pointing at the intended road, again relying on the driver's ability to interpret the non-verbal pointing. In the context of voice command systems, however, this non-verbalized information may be lost, rendering correct interpretation of the voice command more difficult or even impossible. Accordingly, it would be beneficial to provide a system and method that is capable of utilizing additional types of information in interpreting user commands. Such enhanced ability to correctly process user commands would be beneficial in many contexts such as driver assistance via a heads-up display (HUD) or autonomous vehicle control.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

Figure 1:
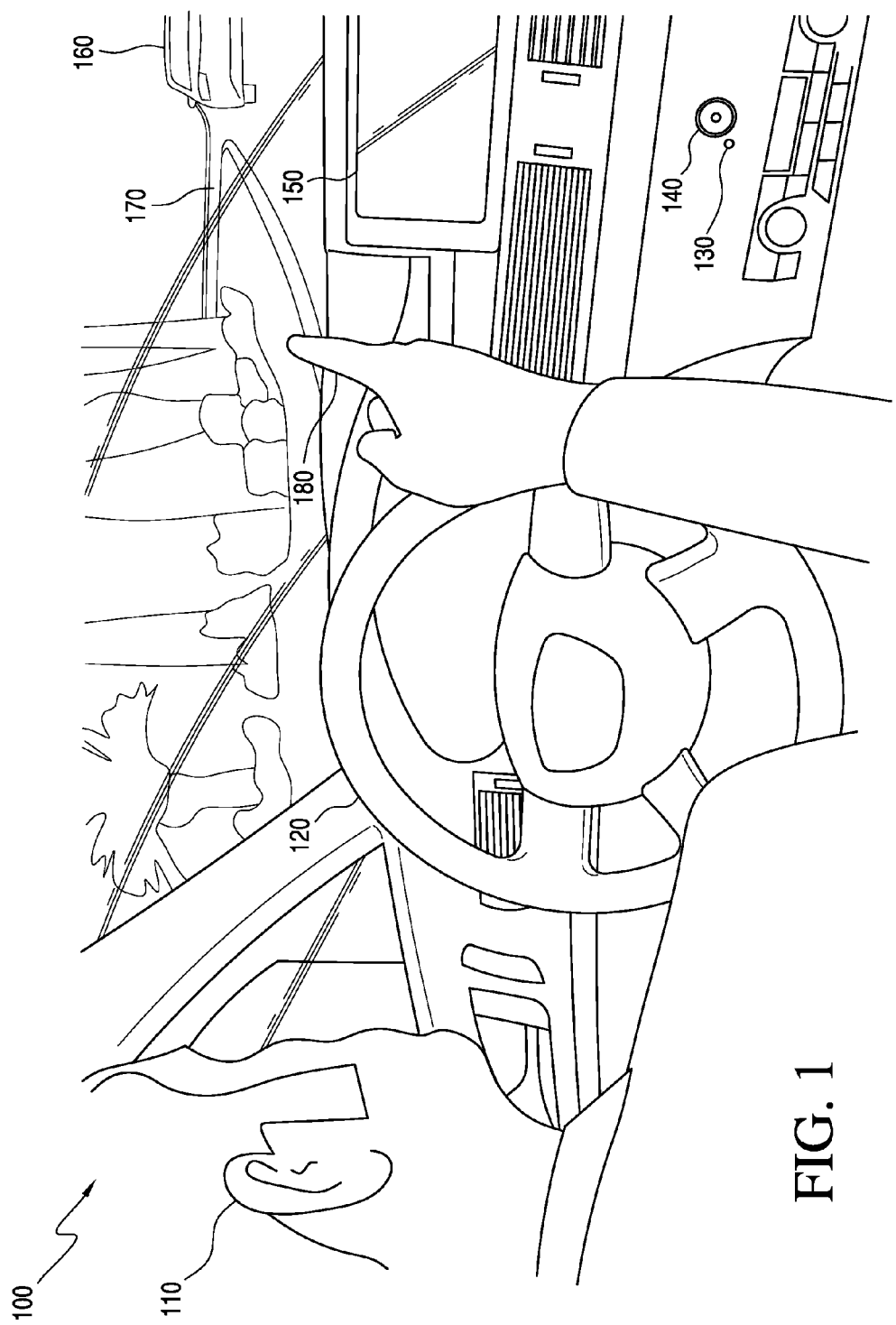
FIG. 1 illustrates an exemplary environment for receiving and interpreting user commands in accordance with aspect of the present application.

FIG. 1 illustrates an exemplary environment 100 for receiving and interpreting user commands. As shown, the exemplary environment 100 may include a vehicle and surrounding area. As such, the environment 100 includes at least one human user 110. The human user 110 may be a driver of the vehicle that utilizes a steering wheel 120 and pedals (not shown) to control the motion of the vehicle. Alternatively or additionally, the at least one human user 110 may be a passenger that is not responsible for direct operation of the vehicle. For example, the vehicle may be an autonomous vehicle that, at least some of the time, uses a computerized system to control the motion of the vehicle. In some such embodiments, the steering wheel 120 and pedals may not be present, while in others the steering wheel 120 and pedals may be present to enable the passenger 110 to assume control of the vehicle if the autonomous control disengages and the vehicle enters manual operation mode.

The vehicle may also include various input devices and output devices for enabling the vehicle to exchange information with the human user(s) 110. For example, as shown, the vehicle includes a microphone 130 and a camera 140 for receiving input from the user 110 and a display 150 for displaying output to the user. The display 150 may also include a touchscreen for receiving additional input from the user. Additional or alternative input/output devices may be included in the vehicle. For example, the vehicle may include a heads-up display (HUD) (not shown) that projects information onto the windshield in the line of sight of one or more of the human users. The vehicle may also include input and output devices for interacting with entities and object other than the human users; for example, the exterior of the vehicle may include cameras, infrared sensors, ultrasonic sensors, and other devices for viewing or otherwise identifying objects in the area surrounding the vehicle such as, for example, other vehicles 160 or lanes and intersections 170. The vehicle may also include one or more inter-device interfaces such as GPS interface for receiving location information or a network interface (e.g., WiFi or 4G) for receiving various additional information such as, for example, map data, construction information, weather information, or any other information that may be relevant to operation of a vehicle.

According to various embodiments described herein, a vehicle interaction system may utilize the various inputs described to decipher user commands and subsequently instruct the appropriate systems as to how to implement the command. For example, in an autonomous vehicle embodiment, the user may say "turn there" while pointing 180 as shown. The microphone 130 receives the voice command while the camera 140 receives image or video data of the gesture 180. The interaction system may also have access to a model of the surrounding environment or map data describing the roads in the immediate area. Combining all of this information, or at least a portion thereof, the interaction system determines that the user wishes the vehicle to turn left onto the road 170 to which he is pointing, rather than any other road that may also be in the area.

As another example, the user may issue the voice command "highlight that blue car," which is received via the microphone. The interaction system may then refer to information about the surrounding environment to determine that the vehicle 160 is the only blue car in the vicinity and, subsequently, instruct a HUD system to display a highlight with the vehicle 160 in the user's 110 field of view. Various additional contexts for use of command decoding will be apparent in view of the present specification.

Figure 2:
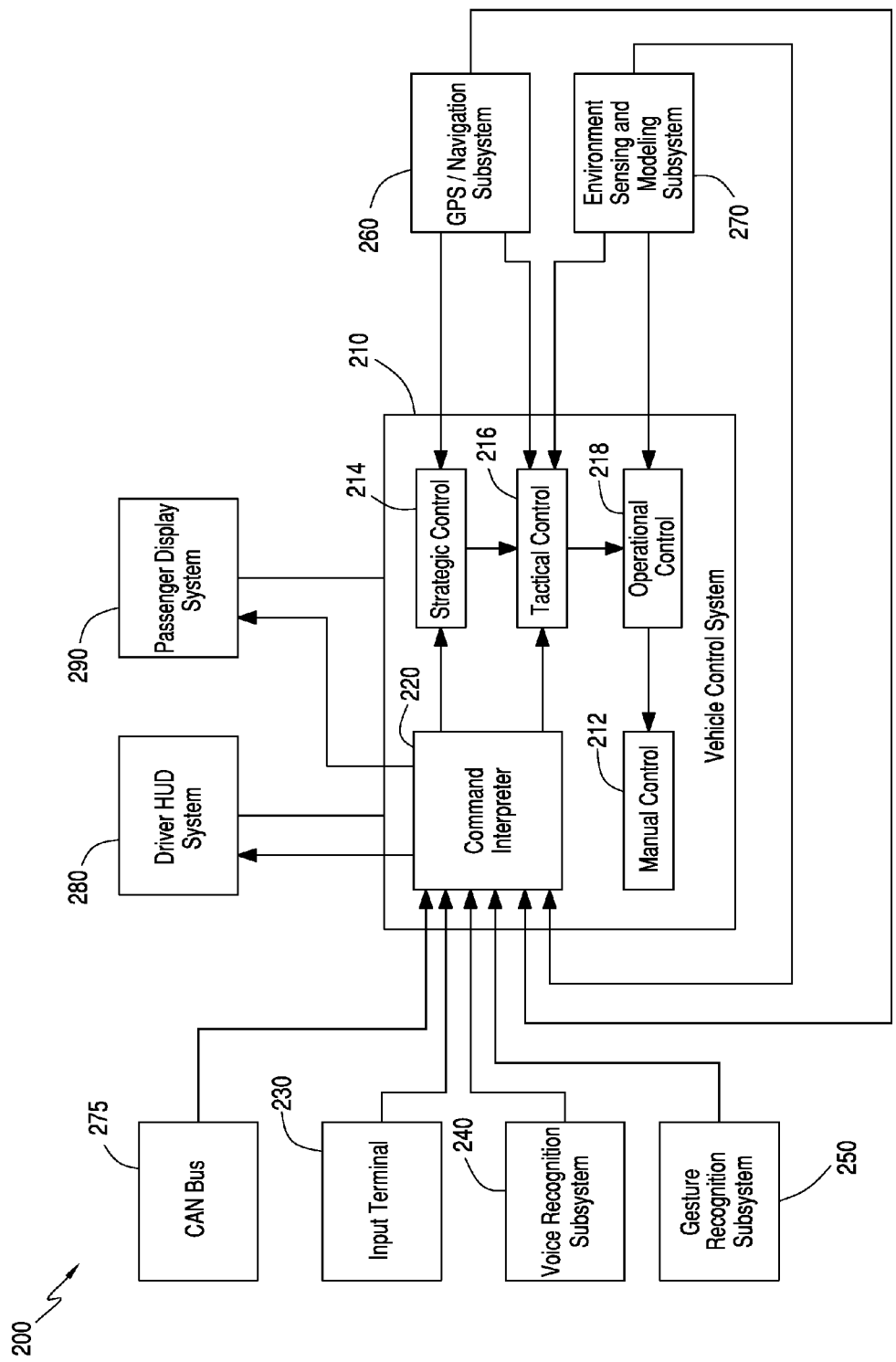
FIG. 2 illustrates an exemplary vehicle interaction system in accordance with aspect of the present application.

FIG. 2 illustrates an exemplary vehicle interaction system 200. As shown, the system 200 is centered around a vehicle control system 210 including a manual control 212 subsystem, three autonomous control subsystems 214, 216, 218, and a command interpreter 220 configured to pass instructions to these subsystems. In various embodiments, such as those embodiments wherein the system 200 is implemented in a non-autonomous vehicle, the command interpreter 220 may be implemented as a standalone element or the autonomous control modules 214, 216, 218 may be omitted. Further, it will be appreciated from the following description that the command interpreter 220 may be used to translate input information from virtually any group of input subsystems into instructions for virtually any group of "output" subsystems and, as such, the various subsystems disclosed are examples illustrating the various utilities of the command interpreter 220.

Autonomous control of a vehicle may be separated into multiple levels of control that are associated with different goals and detail granularities. For example, according to some models, autonomous control may be split into three tiers: strategic control 214, tactical control 216, and operational control 218. According to some such models, strategic control is the highest level of control and relates to the user's end goals in operation of a vehicle. For example, strategic control may be concerned with the destination of the vehicle, route preferences (e.g., scenic routes, quickest routes, shortest routes, etc.), or avoidance of specified situations (e.g., certain intersections, certain roads, bad weather, construction, traffic, etc.) Tactical control is the middle level of control and is directed to the maneuvers employed by the vehicle to achieve the goals of the strategic level such as, for example, lane changes, turns, pulling over, stopping at a stoplight or stop sign, stopping for pedestrians, etc. Operational control is the lowest level of control and is directed to the operation of the vehicle to achieve the goals of the tactical control. For example, operational control may focus on acceleration, braking, and steering while staying in the lane and avoiding collision. Given this paradigm, implementation of autonomous control may also involve separating these tiers among different modules or processes that each perform the assigned functionality and instruct the lower tiers on how to operate. As shown, the vehicle control system 210 includes separate strategic control 214, tactical control 216, and operational control 218 subsystems. Alternative implementations will be apparent, such as monolithic implementations of all control levels into a single module or implementations according to different control paradigms than that described here will be apparent. In some situations, the user may wish to take over manual control, such as when the operational control 218 is not performing sufficiently satisfactorily to the user. To enable such operation, the vehicle control system 210 may also include a manual control subsystem 212 that, when engaged, enables translation of the steering wheel, pedals, or other manual control devices to be used for operating the vehicle.

The vehicle control system 210 also includes a command interpreter which receives instruction and context input and subsequently translates this information into instructions for the other subsystems. Various methods for implementing such functionality will be described below. For example, the command interpreter may utilize multimodal principles and sensor fusion to utilize all available information of many different types to determine one or more appropriate instructions to issue to other subsystems. As shown, the command interpreter 220 receives inputs from five distinct subsystems, though it will be understood that additional or fewer inputs may be used. As shown, the command interpreter may receive input from an input terminal 230 such as a touchscreen display, a voice recognition subsystem 240, a gesture recognition subsystem 250, a GPS/navigation subsystem 260, and an environment sensing and modeling subsystem 270.

The voice recognition subsystem 240 may include a microphone and hardware configured to recognize spoken words received via the microphone. As such, the voice recognition subsystem 240 may continuously analyze sensed audio data to locate human speech patterns and then generate a textual or other simple representation of one or more words. In some embodiments, the voice recognition system may generate multiple possible words or phrases based on the same input, such as when the voice recognition system cannot resolve the spoken word or phrase with 100% certainty. In such embodiments, the voice recognition system 240 may provide possible phrases to the command interpreter 220. In some such embodiments, the voice recognition system may also provide a "confidence value" for each such possible phrase to the command interpreted 220, indicating how confident the voice recognition system is that each possible phrase what the actual phrase spoken.

The gesture recognition subsystem 250 may include a camera and hardware configured to interpret video or image data sensed by the camera to recognize gestures performed by the human user. The gesture recognition subsystem 250 may utilize virtually any method to perform such gesture recognition. Upon identifying a gesture, the gesture recognition system 250 passes data representative of the gesture to the command interpreter 220. For example, the gesture recognition subsystem 250 may provide a textual or other simple indication of the gesture performed such as "pointing left" or "swiping right." As another example, the gesture recognition may provide more "raw" data descriptive of the gesture which is to be further interpreted by the command interpreter 220. In this example, the gesture recognition subsystem 250 may provide one or more vectors indicating a position or motion of a user's hand, an indication of whether the hand is open or closed, or a vector indicating a direction in which a finger points. Various additional data forms for representing a human gesture will be apparent. Similar to the voice recognition subsystem 240, the gesture recognition subsystem 250 may report multiple possible gestures and such possible gestures may also be accompanied by associated confidence values.

The command interpreter 220 may also use input from subsystems that receive information other than user input. For example, the system 200 may include a GPS/navigation subsystem 260 that provides current location and surrounding map information to the command interpreter 220. The GPS/navigation subsystem 260 may also provide this information to the autonomous control subsystems 214, 216 for use in performing those functions as well. Similarly, an environment sensing and modeling subsystem 270 that provides information about the vehicle's surrounding to the autonomous control subsystems 216, 218 may also be used as input into the command interpreter. Virtually any environment sensing and modeling subsystem 270 may be used. For example, according to one embodiment, the environment sensing and modeling subsystem 270 includes one or more externally mounted cameras and hardware configured to analyze image or video data received therefrom to identify other vehicles, road and lanes edges, and other objects in the surrounding area. The environment sensing and modeling subsystem 270 may also gather additional information about such sensed objects such as, for example, object location, object velocity, object color, vehicle make and model, license plate numbers, and virtually any other information that can be used to describe the surrounding environment. In some embodiments, the environment sensing and modeling subsystem 270 may directly communicate with such objects to obtain such information. For example the environment sensing and modeling subsystem 270 may exchange messages with other vehicles via a wireless communications interface to receive information describing the vehicle's location and speed. Various additional methods for obtaining information about the surrounding environment will be apparent.

In some embodiments, the environment sensing and modeling subsystem 270 uses the sensed information to generate a model of the surrounding environment. For example, the environment sensing and modeling subsystem 270 may create data objects representing each sensed object and storing information about each object. For example, to represent a sensed vehicle, the environment sensing and modeling subsystem 270 may create a vehicle object including position, speed, make, model, and color properties that may be accessible by the command interpreter 220 or other subsystems. Such data objects may be nested within a larger "environment" data object that provides environment wide functionality such as locating all moving objects in the environment or locating all of objects exhibiting certain characteristics (e.g., "all blue cars"). Various alternative manners for organizing sensed environment information will be apparent.

In various embodiments, the command interpreter 220 may additionally receive as input information from a controller area network (CAN) bus 275. As will be understood, various vehicles may include a CAN bus to enable communication between various microcontrollers and other electronic control units associated with vehicle subsystems including, in some embodiments, one or more of the subsystems described above. As such, the command interpreter 220 may receive, as input via the CAN bus 275, information from a transmission, airbag, braking, cruise control, power steering, audio, power window, door, mirror adjustment, or battery subsystems. Using the various techniques described herein, the command interpreter may use this information to further refine interpreted commands. In some embodiments, this information may be alternatively or additionally provided to a vehicle state sensing subsystem (not shown) that provides a description of the vehicle state as an input to the command interpreter 220. For example, if the state sensing subsystem reports a low fuel level, the command interpreter may be more confident in interpreting a command as an instruction to drive to a gas station or may instruct the strategic control or tactical control subsystems 214, 216 to choose a route that passes a gas station. As another example, if the state sensing subsystem indicates that a vibration level is high in the cabin, the command interpreter 220 may interpret a "change lane" command to indicate that a lane that is either known to be or may possibly be less bumpy be chosen as opposed to choosing a lane that avoids obstacles or that is better for sightseeing.

In addition to receiving current data about user input and other information, the command interpreter may also utilize historical information related to any of these inputs. For example, in various embodiments, a historical data subsystem may keep a log of the inputs received from one or more of the other subsystems and make such information available to the command interpreter at a later time. In other embodiments, the command interpreter itself may implement such functionality. Further, in some embodiments, one or more of the subsystems may maintain historical data themselves to be provided to the command interpreter 220. For example, the voice recognition subsystem 240 may make all sensed phrases over a period of time (e.g. last 10 seconds, last 2 hours, or an indefinite period of time) available for use by the command interpreter.

As noted above, the inputs into the command interpreter 220 may include alternative or additional types of input. Using multimodal processing, the inputs into the command interpreter are indefinitely extensible and may even be incorporated into the system 200 in a seamless plug-and-play fashion. For example, additional inputs such as a gaze detection subsystem or a mobile device or tablet interface may be incorporated into the system 200 for interpretation by the command interpreter 220.

As will be described in greater detail below, the command interpreter 220 translates the various input available into commands for other subsystems. For example, the command interpreter 220 may transmit instructions to the various autonomous control subsystems, such as the strategic control 214 subsystem or the tactical control subsystem 216 such as, for example, an instruction that the destination of the autonomous vehicle should be changed or that the vehicle should change lanes.

As another example of inter-system instruction, the command interpreter 220 may instruct a driver HUD subsystem 280 or passenger display subsystem 290 to display one or more graphics in response to the interpreted input. The driver HUD subsystem 280 may be, for example, a heads up display as described in the parent applications of the present application. The passenger display subsystem 290 may be an additional heads up display or a different type of display such as a monitor. In some embodiments, the input terminal and passenger display subsystem 290 may be the same physical device such as a touch-screen display. As an example of an instruction to the display systems 280, 290, a passenger may say "turn left there" as an instruction to the driver on a non-autonomous vehicle or an autonomous vehicle operating in manual mode. The command interpreter, using the voice command, the passenger's gesture, environment model, and nearby map information, may instruct the driver HUD subsystem 280 to highlight the intended road for the driver.

Such instructions to other subsystems may be communicated according to virtually any method for inter-system communication. For example, the command interpreter 220 may generate an instruction message having a format known to be understood by the target subsystem. As another example, the command interpreter 220 may call an exposed function of the target subsystem known to be associated with the instruction. Such function call may be accompanied by one or more parameters as will be described below.

Figure 3:
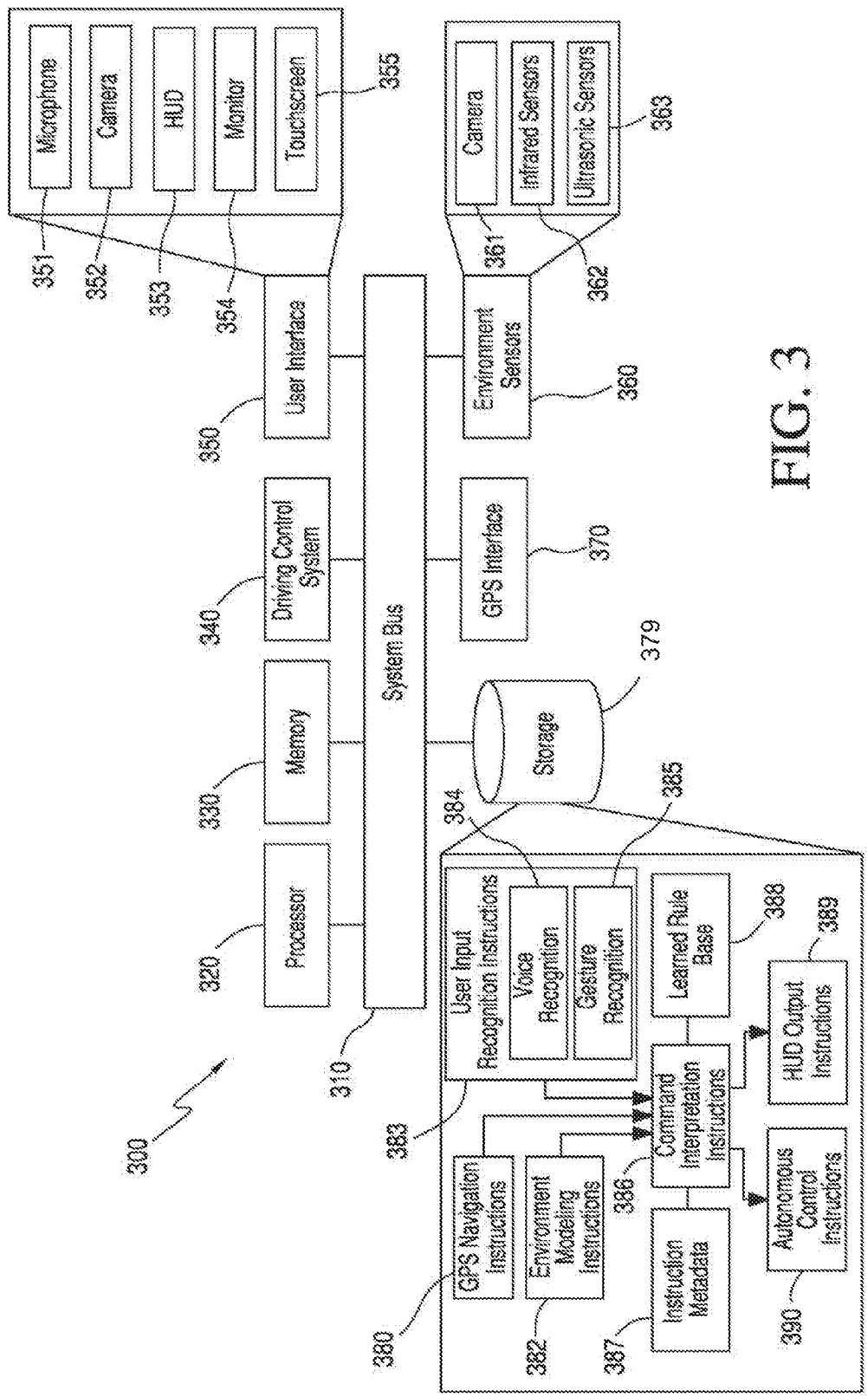
FIG. 3 illustrates an exemplary hardware system for implementing a vehicle interaction system in accordance with aspect of the present application.

FIG. 3 illustrates an exemplary hardware system 300 for implementing a vehicle interaction system. The exemplary hardware device 300 may correspond to one or more elements of the vehicle interaction system 200 of FIG. 2. As shown, the device 300 includes a processor 320, memory 330, driving control system 340, and storage user interface 350, environment sensors 360, GPS interface 370, and storage device 379 interconnected via one or more system buses 310. It will be understood that FIG. 3 constitutes, in some respects, an abstraction and that the actual organization of the components of the device 300 may be more complex than illustrated. Further, it will be understood that in alternative embodiments different hardware systems may be used to implement some of the components of the interaction system 200 or an alternative interaction system including a different set of subsystems. For example, the voice recognition and gesture recognition subsystems 240, 250 may be implemented as separate hardware devices including separate processors, memory, storage, or other hardware. In such alternative embodiments, the hardware device 300 may, instead of implementing these subsystems, include a hardware or software interface to communicate data or instructions with the external subsystems.

As used in this application, the term "subsystem" or "system" may refer to both co-resident system (system that utilize the same processor or other hardware as another system) and external system (system that utilize hardware that is separate from other system). For example, according to some embodiments, the command interpreter subsystem and autonomous control subsystems may be co-resident with respect to each other by utilizing the same processor, but the voice and gesture recognition subsystems may be external subsystems to the command interpreter subsystem. Further in this example, the voice and gesture recognition subsystems bay be co-resident subsystems with respect to each other. Various additional configurations will be apparent. In some embodiments, the command interpreter may not be implemented as a separate subsystem but, instead, integrated into another subsystem. For example, an autonomous control subsystem may implement a command interpreter that operates according to methods described herein.

The processor 320 may be any hardware device capable of executing instructions stored in the memory 330 or the storage 379. As such, the processor 320 may include a microprocessor, field programmable gate array (FPGA), application-specific integrated circuit (ASIC), or other similar devices.

The memory 330 may include various memories such as, for example L1, L2, or L3 cache or system memory. As such, the memory 330 may include static random access memory (SRAM), dynamic RAM (DRAM), flash memory, read only memory (ROM), or other similar memory devices.

The driving control system 340 may include various hardware for enabling computer control of vehicle motion. For example, the driving control system may include a motor for controlling a combustion engine throttle valve, an electric drive motor and interface for controlling throttle, two motors and associated controllers configured to actuate brake calipers, transmission actuators to effect shifting on command, or two motors and associated controllers configured to alter the angle of the vehicle's wheels. Various additional or alternative hardware for enabling computer control of a vehicle will be apparent. In various embodiments, the driving control system 340 may also send various forms of feedback as input back to the processor 320 or directly to the memory 330 or storage 379. In some such embodiments, this feedback may also be used as input for command interpretation.

The user interface 350 includes one or more hardware devices for communicating with a user or otherwise receiving input or displaying output to a user. For example, the user interface 350 as shown includes a microphone 351 for receiving audio information from a user (e.g., voice commands), a camera 352 for receiving image or video data (e.g., data for use in performing gesture recognition), a HUD 353 for displaying graphics to a user in their field of view, a monitor 354 for displaying information to the user, or a touchscreen 355 for receiving input from the user. As noted above, a variety of alternative or additional devices may be included.

The environment sensors 360 include one or more hardware devices for sensing information about the environment surrounding the vehicle. For example, as shown, the environment sensors 360 include at least one camera 361, infrared sensors 362, and ultrasonic sensors 363. Various alternative or additional hardware devices will be apparent for inclusion as environment sensors 360 such as, for example, radar sensors.

The GPS interface 370 may be a hardware device for receiving transmissions from GPS satellites for use in determining a current location of the vehicle. For example, using such transmissions and current methods, the GPS interface 370 or processor 20 may be able to calculate the vehicle position to a value that is accurate to within about 10 centimeters of the true vehicle position.

The storage 379 may include one or more machine-readable storage media such as read-only memory (ROM), random-access memory (RAM), magnetic disk storage media, optical storage media, flash-memory devices, or similar storage media.

For example, as shown, the storage 379 includes GPS navigation instructions 380, environment modeling instructions 382, user input instructions 383 including voice recognition instructions 384 and gesture recognition instructions 385, HUD output instructions 389, and autonomous control instructions 390 for performing the various functions described above as being associated with each of these respective subsystems. As noted above, one or more of these subsystems may be instead implemented entirely by an external subsystem, in which case the respective instructions 380-390 may be omitted and replaced with simple instructions for enabling communication with such external subsystem. These instructions may be implemented in virtually any manner to perform the functions described herein.

As shown, the storage 379 also includes command interpretation instructions 386 that receive input from the various input subsystems 380-385 and provides instructions to the various output subsystems 389, 390. Exemplary methods for implementing the command interpretation instructions 386 will be described in greater detail below. For example, in various embodiments, the command interpretation instructions 386 utilize instruction metadata 387 to assist in generating an instruction that will be properly interpreted by the target output subsystem. Additionally, in various embodiments that utilize machine-learning to drive the processing performed by the command interpretation instructions, the storage 379 may also include a database of learned rules or other data structures for persisting the machine learning state.

It will be apparent that various information described as stored in the storage 379 may be additionally or alternatively stored in the memory 330. In this respect, the memory 330 may also be considered to constitute a "storage device." Various other arrangements will be apparent. Further, the memory 330 and storage 379 may both be considered to be "non-transitory machine-readable media." As used herein, the term "non-transitory" will be understood to exclude transitory signals but to include all forms of storage, including both volatile and non-volatile memories.

While the device 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein.

FIG. 4 illustrates an exemplary method 400 for interpreting user commands. The exemplary method 400 may describe, at a high level, the actions performed by the command interpreter 220 of FIG. 2 or the processor 320 executing the command interpretation instructions 386 of FIG. 3.

The method 400 begins in step 410 and proceeds to step 420 where the command interpreter receives voice input from the user indicating a command to the vehicle interaction system. For example, the command interpreter may receive such a voice command from a voice recognition subsystem. In the embodiment of FIG. 4, the voice command begins the command interpretation process; it will be understood that additional or alternative forms of input may initiate command interpretation in other embodiments, such as detection of a gesture, pressing of a button, or a specific keyword voice command indicating the user's desire to issue a command (e.g., the user preceding the actual voice command with a phrase such as "voice command" or "car"). In other embodiments, the command interpreter may not be triggered to interpret commands and, instead, may continuously monitor inputs to discern commands.

Next, in step 430, the command interpreter retrieves any additional user input (such as additional voice or gestures) and context information (such as map or environment model data). The inputs retrieved may be determined based on temporal alignment with the voice input from step 420; for example, the command interpreter may retrieve any inputs that were received within 10 seconds of the voice input of step 420. In various embodiments, the command interpreter uses sensor fusion such as, for example, Bayesian networks to combine the various different data inputs to generate a combined view of all of the data available. In some embodiments, such as those embodiments that continuously monitor inputs and do not rely on an initiating trigger, steps 420 and 430 may be combined into a single step of applying sensor fusion algorithms to the available input.

In step 440, the command interpreter uses the available input to determine one or more appropriate instructions to issue to one or more other subsystems. For example, the command interpreter may interpret that voice command "turn behind that blue car," a hand gesture to the right, environment information showing the location of a blue car in the environment, and map data identifying a street near that location of the blue car into an instruction to the autonomous control subsystem to turn right on the identified street. This step may be implemented using various artificial intelligence, rules engine, hard coded, or other approached. For example, a Bayesian network may be used to indicate the result of fused inputs from step 430. As another example, the command interpreter may utilize a more linear, rules-based machine learning approach as will be described below. After generating the instruction(s), the command interpreter forwards the instruction(s) to the appropriate subsystem(s) in step 450 for execution, and the method 400 proceeds to end in step 460.

As noted above, in various embodiments, the command interpreter may utilize instruction metadata to determine how to interact with the other subsystems in the vehicle interaction system. For example, the instruction metadata may be a list of instructions understood by each subsystem to which the command interpreter will transmit interpreted instructions. The use of such metadata may render the command interpreter extensible on the output side in that base support for additional subsystems may be added (in some embodiments) simply by providing instruction metadata to the command interpreter. For example, instruction metadata may be loaded onto the storage of the vehicle interaction system using installation media (e.g., a USB drive or DVD), via a network connection (e.g., the command interpreter may recognize the new component and query a network database via a WiFi or 4G connection to retrieve metadata associated with the new component), by the new subsystem itself (e.g. the new subsystem upon activation may be configured to provide its instruction metadata to the command interpreter in a plug and play fashion), or from another portion of storage (e.g., the command interpreter may have access to a local database of metadata for potential devices from which metadata for the new device may be retrieved). Thereafter, the command interpreter may use various learning techniques to determine appropriate times to send instructions as described by the new instruction metadata. In various embodiments, the learning process may be aided or even skipped by additionally providing rule sets or other learned information directly to the command interpreter upon activation of the new device. As with providing metadata, rule sets previously developed in a lab environment for the command interpreter may be provided with installation media, via a communications network, directly from the new component configured to operate with the command interpreter, or in a local database of initial rules for various anticipated subsystems.

FIG. 5 illustrates an exemplary data arrangement 500 for storing function metadata. The data arrangement may describe the contents of the instruction metadata 387 of FIG. 3. It will be apparent that the data arrangement 500 as illustrated may be an abstraction in some respects. The data arrangement 500 may be stored as virtually any useful data structure such as an array, table, tree, or linked list.

As shown, the data arrangement 500 stores multiple records 540-580 that each include multiple fields 510-530. An instruction name field 510 stores an identification of an instruction that can be issued by a command interpreter based on user input. In some embodiments, this name field 510 stores a name of a function exposed to the command interpreter by subsystem to which the instruction applies. A parameters field 520 stores an identification of zero or more parameters that can be passed with the instruction to further define the action to be performed based on the instruction. In various embodiments, the parameters may additionally specify a data type for each specified parameter name or specify a value provided by a specific subsystem. For example, a "direction" parameter may be an enumerated type accepting only the values RIGHT and LEFT while a "streetName" may be a type that accepts an identification of a street as identified by a map and navigation subsystem (and, as such, the command interpreter may simply pass such data from the input map and navigation subsystem to the instructed subsystem without modification to the value itself). A target subsystem field 530 identifies the subsystem to which each instruction applies. Such identification may be made by subsystem name, subsystem location on the bus, or any other manner known to those of skill in the art.

It will be apparent that various additional or alternative metadata may be included in each or some records. For example, a field may be included to specify a required formatting for an instruction such as an XML template to be instantiated with parameter values. Various additional methods for specifying instruction format metadata as well as additional types of metadata will be apparent.

As an example, four metadata records 540-570 are illustrated along with numerous additional metadata records 580. All four illustrated metadata records are shown to correspond to an autonomous control subsystem. The first metadata record 540 indicates that the command interpreter may issue a "changeLane" instruction to the autonomous control subsystem along with an indication of which direction the vehicle should merge. The second metadata record 550 indicates that the command interpreter may instruct the autonomous control subsystem to perform a turn according to two parameters: a direction for the turn and a name of the street onto which the vehicle should turn.

The third and fourth metadata records 560, 570 indicate two different ways to instruct the autonomous control subsystem to slow down. First, the command interpreter may simply instruct the autonomous control subsystem to slow down without any parameters. The autonomous control subsystem, upon receiving such instruction, may implement the slow down function in any manner. For example, the autonomous control subsystem may simply slow down by 5 or 10 miles per hour. Second, the command interpreter may send a speed along with the instruction, indicating by how much the speed should be decreased. It will be apparent from the foregoing description and examples that various methods may be used to store instruction metadata and that virtually any information may be included to provide the command interpreter with a listing of instructions that can be understood by each subsystem along with information on how such instructions can be created and issued to the subsystems.

Figure 6:
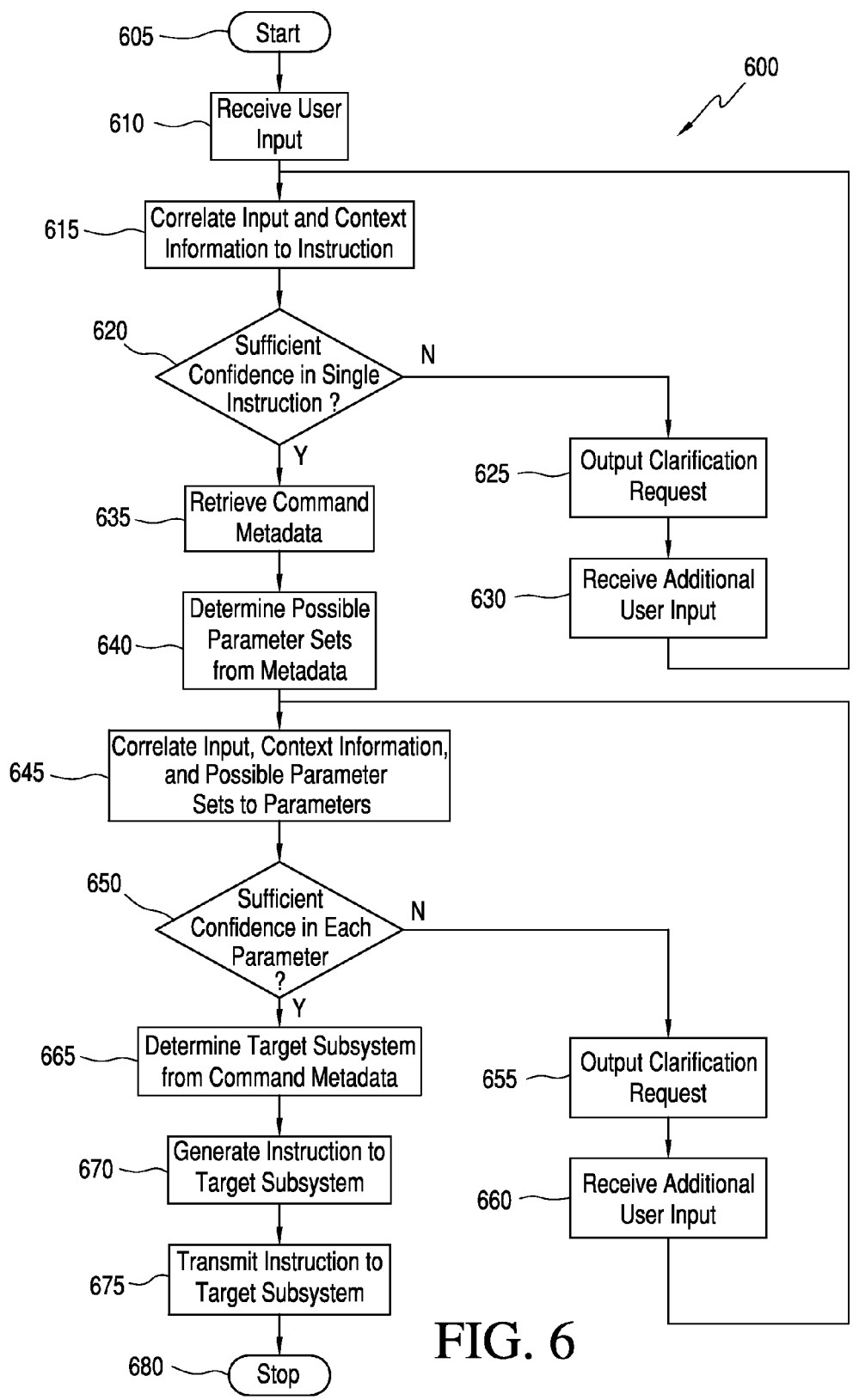
FIG. 6 illustrates an exemplary method for using function metadata to interpret user commands in accordance with aspect of the present application.

FIG. 6 illustrates an exemplary method 600 for using function metadata to interpret user commands. The method 600 may be performed by the command interpreter 220 of FIG. 2 or the processor 320 executing the command interpretation instructions 386 of FIG. 3. Further, the method 600 may constitute, at least in some respects, a specific implementation of the high level method 400.

The method begins in step 605 and proceeds to step 610 where the command interpreter receives user input. For example, the command interpreter may receive input from the voice recognition subsystem or gesture recognition subsystem. The method 600 then proceeds to step 615 where the command interpreter correlates the received input along with context information (e.g. map data or an environment model) to an instruction command such as, for example, an instruction name as identified by the instruction name field 510 of the exemplary metadata arrangement 500. This correlation may be performed in various manners. For example, the command interpreter may simply determine if the recognized spoken phrase matches any of the instruction names. Alternatively, the command interpreter may use a sensor fusion or artificial intelligence technique, such as Bayesian networks, to correlate the inputs to one or more possible instruction commands.

Next, in step 620, the command interpreter determines whether the outcome of step 615 yielded a sufficient result to proceed. For example, in some embodiments, the correlation step 615 may produce multiple possible commands along with confidence levels that each particular command was the command intended by the user. In such embodiments, the command interpreter may utilize some method of selecting a command based on the confidence levels (e.g., pick the highest confidence level above a pre-set threshold, pick the highest confidence level if it is sufficiently larger than the next highest confidence level, etc). In other embodiments, step 615 may result either in a single command value or no command value. If, in step 620, the command interpreter is unable to resolve the correlation to a single command, the method proceeds to step 625 where the command interpreter outputs a request for clarification to the user. For example, the command interpreter may generate an instruction to the driver HUD subsystem or a speaker subsystem to present the request to the user. Such request may be, for example, a request to repeat the command, a request to indicate the desired command among the group of possible commands determined in step 615, or a request to indicate to which available subsystem the command is directed. Various additional methods for clarification will be apparent. After outputting the clarification request, the command interpreter receives the user's response on step 630 and the method proceeds back to step 615 where the additional input is used in a second attempt to correlate the total available input to a command.

Once a command is identified, the method 600 proceeds to step 635 where the command interpreter retrieves the metadata associated with the command. Next, in step 640, the command interpreter determines the possible parameter sets for the indicated command. For example, using the metadata of FIG. 5 and a determined command of "slow down," the command interpreter may determine that there are two possible parameter sets: { } and {speed}. Next, in step 645, the command interpreter correlates the inputs, context information, and possible parameter sets to parameters. Similar to step 615, step 645 may be performed according to any method known to those of skill in the art such as, for example, use of Bayesian networks or application of other learned rules. Next, in step 650, the command interpreter determines whether there is sufficient confidence in a single set of parameter values. For example, as described above with respect to step 620, various embodiments may generate multiple possible sets of parameter values in step 645 associated with respective confidence levels. For example, if the voice recognition input indicates a 90% confidence in the phrase "slow down" being spoken, a 20% confidence in the phrase "4 miles per hour," and a 10% confidence in the phrase "14 miles per hour," the command interpreter may generate three different possible sets of parameter values: { } (i.e., no specified speed) with 10% confidence; {4} with 50% confidence; and {14} with 40% confidence.

If the command interpreter determines in step 650 that no resulting set of parameter values from step 645 is associated with a sufficient confidence level, the method 600 proceeds to step 655 where the command interpreter outputs a request for parameter clarification. For example, the command interpreter may generate an instruction to a HUD subsystem or speaker subsystem as described above. The clarification request may request repetition of the command, selection between multiple possibilities, or may pose some other question to the user. For example, where the user command was "follow the blue car" but the environment model indicates the presence of two blue cars in the surrounding area, the command interpreter may output an instruction to output via the speaker system the question "which vehicle would to like to follow" and an instruction to the HUD subsystem to highlight the two blue cars. Next in step 660, the command interpreter may receive additional user input in response to the clarification request. Following the previous example, the user may respond in many ways such as, for example, speaking the phrase "the blue car on the left," speaking the phrase "car #1" (e.g., where the command interpreter instructs the HUD to number the two blue cars for ease of identification), or pointing to the left car. Next, the method loops back to step 645 where the command interpreter proceed to interpret the total available input and other information to again determine potential sets of parameter values.

Once the command interpreter is sufficiently confident that the desired parameter set has been discerned from all the available inputs, the method 600 proceeds to step 665 where the command interpreter identifies the target subsystem for the instruction by, for example, referring to the retrieved instruction metadata. Then, in steps 670 and 675, the command interpreter generates and transmits the instruction to the target subsystem. For example, the command interpreter may perform a function call that passes a parameter values to the subsystem. As another example, the command interpreter may construct an XML object or other data object identifying the command and parameter values, and subsequently pass the object to the target subsystem via any known method such as, for example, inter-process communication via the operating system. The method 600 then proceeds to end in step 680.

As explained above, various embodiments utilize machine-learning to create rules or other data for use in adequately interpreting user input in view of contextual information. For example, machine learning may be used to create Bayesian networks or other rules as will be described with respect to FIG. 8. FIG. 7 illustrates an exemplary state diagram 700 for enabling machine-based learning in a command interpreter. As shown, various embodiments may utilize both supervised and unsupervised learning 710, 720 to create appropriate data structures for interpreting user commands in conjunction with other information. The learning at each step may be performed in virtually any manner deemed appropriate by those of skill in the art. For example, the machine learning algorithm may be programmed to utilize various data structures and other heuristics for representing available information along with learned information to make decisions. The machine learning algorithm may additionally be programmed to subsequently evaluate the decisions made based on, for example, supervisor feedback, desirability of resulting conditions, or some other fitness function. Various techniques for implementing machine learning will be apparent.

As an initial learning mode, the command interpreter is subjected to lab-based learning 712 in which a prototype or other development model command interpreter is provided with inputs along with expected results. Evaluating the determined instructions against the expected results, the command interpreter evaluates the fitness of the current learned information and potentially modifies the learned information based on the outcome of the fitness function. Using this method of supervised learning, the vehicle manufacturer, designer of the command interpreter, or other party may continue running input sets until the command interpreter satisfactorily interprets the commands provided to it. Once the command interpreter performs adequately, the learned information may be retrieved and subsequently loaded onto each command interpreter produced as a starting point for each new vehicle.

In some embodiments, each new vehicle may enter a user setup learning phase in step 714. During this phase, the command interpreter may interact with the owner of the vehicle or one or more human users that will be using the vehicle to tune the learned information to those users. For example, the users may have different accents, different ways of gesturing, or different expectations from the lab technicians that created the initial learned knowledgebase. In this mode, the command interpreter or accompanying literature may ask the users to perform various gestures, speak various phrases, or generally request certain actions of the vehicle interaction system. The command interpreter may then output instructions based on these inputs, according to the various methods described above, and await the user's feedback as to whether the resulting actions are correct. Alternatively, the command interpreter while in user-setup learning may only indicate the instruction that would be issued via, for example, a HUD subsystem, other display subsystem, or speaker subsystem. The user may then provide feedback indicating whether the selected instruction was correct or not. The command interpreter can then incorporate this feedback into the learning function to further refine the learned information base. Additionally, various other subsystems may include independent user-setup learning phases as well such as, for example, the voice recognition or gesture recognition subsystems.

After the initial user setup 714 is completed (or in embodiments omitting the user setup learning phase 714), the vehicle and command interpreter enter active operation mode 722, wherein the command interpreter operates as described above with respect to FIGS. 1-6. Specifically, the command interpreter may receive input from various systems, correlate the total input to various instructions, and provide such instructions to other subsystems. Various embodiments may also utilize dynamic learning 724 to further refine learned rules or other learned information during active operation 722. In some such embodiments, the command interpreter may infer from various events that a previous decision was incorrect and consequently use the decision and subsequent user actions to further refine the learned information base. For example, when the user indicates that an action taken by the command interpreter is incorrect (e.g., the user shakes his head or says "no, that isn't right") or issues a contradictory command shortly after the command interpreter sends an instruction to another subsystem (e.g., the user says "turn left on Elm street" after the command interpreter previously interpreted user input into an instruction to turn right on Elm street), the command interpreter may determine that the previous decision was incorrect. Various additional methods for incorporating dynamic learning during active operation of the command interpreter will be apparent.

As explained above, the command interpreter may store learned rules or other information in virtually any manner. One such method of storing information is in the form of rules. FIG. 8 illustrates an exemplary data arrangement 800 for storing command interpretation rules. This data arrangement may describe the contents of the learned rule base 388 of FIG. 3. It will be apparent that the data arrangement 800 may be a simplification in some respects; for example, while the values in the data arrangement 800 are presented in a human-readable code form, various implementations may not store learned information in human readable form. As another alternative, the data arrangement 800 may be presented as a node network or tree such as, for example, embodiments that utilize Bayesian networks for sensor fusion and input interpretation. While the examples shown in FIG. 8 relate to interpreting input related to determining command parameters, it will be apparent that a similar approach may be used to define rules for interpreting input to identify intended commands or other intended actions.

As shown, the data arrangement includes a criteria field 810 that stored one or more conditions for determining applicability of a rule, a result field 820 for storing one or more parameters to be used when the rule is applicable, and a confidence field 830 indicating a confidence value to be assigned to or added to a total confidence for a parameter for a resulting parameter value. In various embodiments, the confidence field 830 may be omitted. For example, some embodiments may not utilize confidence values or may infer all confidence values from the confidence in the respective inputs.

As an example, a first learned rule 840 indicates that when the command interpreter is identifying parameters for a "turn" command and when the voice recognition subsystem has identified the spoken phrase "left," the command interpreter will determine, with 95% confidence, that the intention of the user was to turn left. Accordingly, assuming that 95% confidence is sufficient once all relevant rules have been analyzed, the command interpreter will generate an instruction to turn left. As another example, a second learned rule 850 indicates that when the command interpreter is identifying parameters for a "turn" command, the voice recognition subsystem has identified the spoken phrase "there," and the gesture recognition subsystem has identified the user has pointing left, the command interpreter will determine that the intention of the user is to turn left. Instead of assigning a static confidence value to this parameter, however, the command interpreter will utilize the gesture recognition subsystems confidence in the identification of the leftward point gesture. Thus, if the gesture recognition is only 20% confident that the user indeed pointed left, the command interpreter will be only 20% confident that the user wishes to turn left.

From these two example rules 840, 850 it can be seen that multiple rules may be applicable. For example, a user may speak the phrase "turn left there" and point left. In such a case, both the first and second learned rules 840, 850 would likely be applicable. These results of these rules are the same and as such applicability of the two rules does not conflict. In such a situation, the command interpreter may utilize only the highest confidence level, may add the confidence levels together, or utilize some other method of combining the confidence levels. In other situations where the results conflict, the command interpreter may return only the result with the highest confidence or may return both parameter possibilities along with associated confidences. For example, where the user speaks the phrase "turn left there" but the gesture recognition subsystem identifies a "pointing right" gesture with 20% confidence, both rules 840 and 860 may be applicable. The command interpreter may return only the left turn result from rule 840 because it is associated with a higher confidence or may return both possibilities (right turn or left turn) with associated confidences. The command interpreter may then proceed, for example to determine if the confidence is any parameter is sufficient and, if not, request clarification according to steps 650, 655 of the exemplary method 600.

This example also illustrates opportunities for user-setup or dynamic learning. For example, some users may have difficulty identifying verbally whether they wish to turn left or right in situations where they are not afforded much time to think about what they are about to say. In other words, a user wishing to turn right may instead incorrectly say "turn left" but point in the intended direction as the gesture does not require a mental distinction between the concepts of left and right. Using the rules illustrated, the vehicle would likely begin to turn left and the user could then follow up with a correction such as speaking the phrase "No, I meant turn right." The command interpreter, in addition to sending a new instruction to the autonomous control subsystem, may reevaluate the previously issued left turn instruction as incorrect and adjust the confidence of example rule 840 downward (e.g. to 80%) or the confidence of example rule 860 upward (e.g., 1.5*Gesture.Confidence or Gesture.Confidence+20). As such, the command interpreter is able to adapt to a user is at times unable to discern left from right by placing less confidence when the user speaks the word "left" or "right" or by placing increased confidence in gestures. Various additional applications of such functionality will be apparent.

As noted above, command and parameter interpretation may take context information, such as map data or environment models into account when interpreting commands. Such references to context information may be used in criteria or results. As an example, learned rule 870 shows that when the command interpreter is identifying parameters for a "turn" command and the voice recognition subsystem has identified the spoken phrase "there," the command interpreter may return one or more upcoming streets on the map. Specifically, as shown, the result returns each street that is in front of the vehicle within the next 100 feet. Each such street is assigned a confidence that is greater the closer the street is to the vehicle; specifically, the confidence for each street in the next 100 feet is given a confidence value of 100 minus the distance to that street. Thus, application of this rule 870 alone would most likely result in the selection of the closest street to the vehicle. In some embodiments, application of additional rules may increase the confidence of streets that are further away from the vehicle.

As a final example, a fourth learned rule 880 indicates that when the command interpreter is identifying parameters for a "turn" command and the voice recognition subsystem has identified the spoken words "blue" and "car," the command interpreter will return a result for each street that is closest to or otherwise near a blue car in the environment model. The confidence level assigned to each so-identified street may be a share of 100% divided among the number of blue cars in the environment. Thus, if there are two blue cars in the environment, each identified street may be given only 50% confidence. The command interpreter may then proceed to ask for clarification as to which blue car was intended to be referenced by the user. As will be understood, the data arrangement 800 may include numerous additional rules 890.

While various exemplary methods for implementing the features described herein have been described, it will be appreciated that different methods may be used in whole or in part to accomplish some or all of these features. For example. in FIG. 6, steps 645-650 may be implemented as an iterative process that handles each parameter in the parameter set one at a time. In such embodiments, separate rule sets may be implemented for each parameter type.

Figure 9:
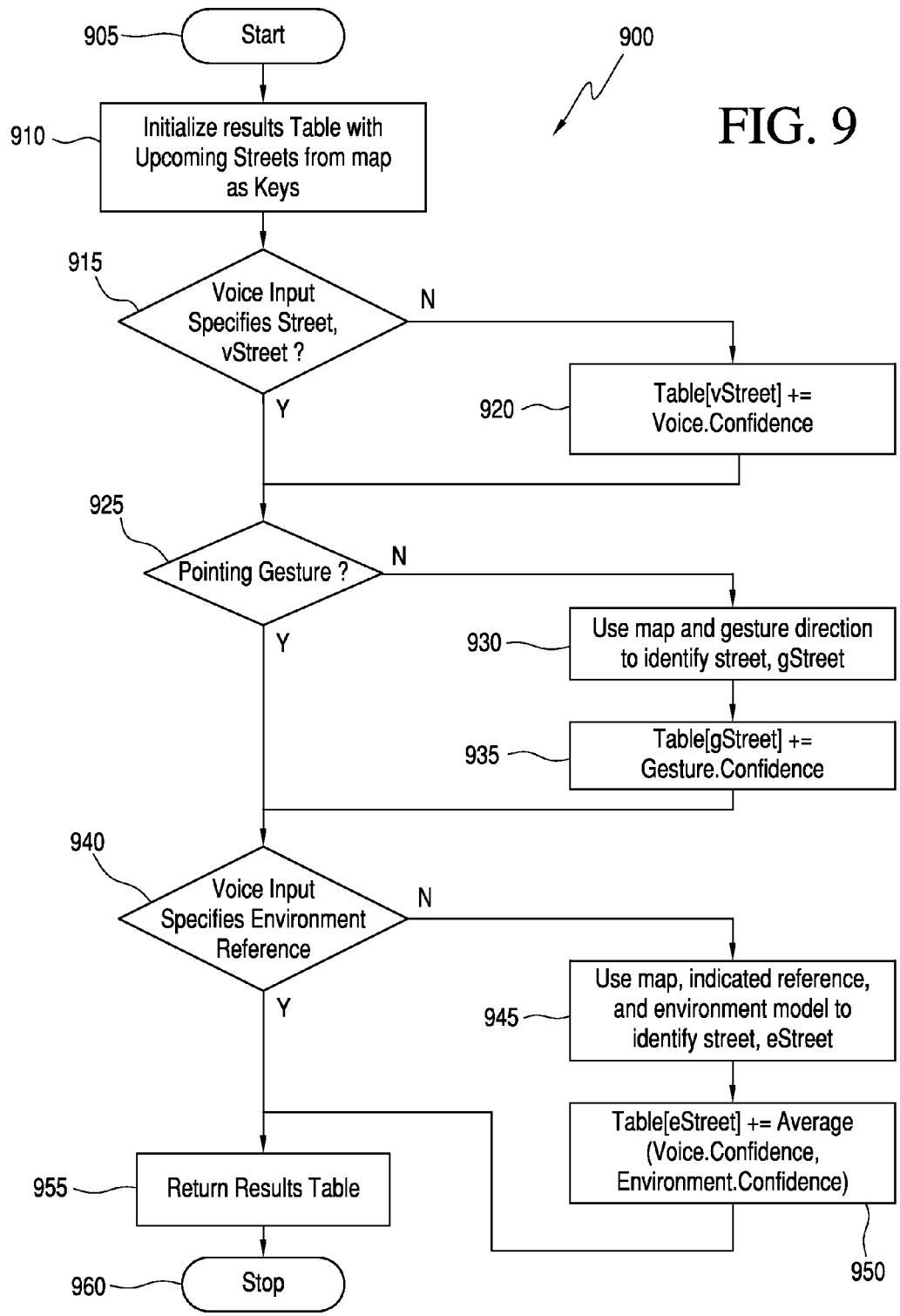
FIG. 9 illustrates an exemplary alternative method for identifying an intended street from user input and context information in accordance with aspect of the present application.

As another example, hard-coded programmer-developed algorithms for interpreting input may be used instead of or to supplement the various artificial intelligence approaches described herein. For example, FIG. 9 illustrates an exemplary alternative method 900 for identifying an intended street from user input and context information. The method 900 may be performed by the command interpreter when it is determined that the instruction to be issued requires or otherwise may be provided with a street name as a parameter. The method 900 may be implemented as a compiled algorithm, as a rule to be interpreted, or in any other manner.

As shown, the method 900 begins in step 905 and proceeds to step 910 where the command interpreter initializes a results table for use in reporting the results at the end of executing the method 900. For example, the table may include a list of streets as keys to a list of respective confidence values. The table may be initiated as an empty table or, as shown, may be initiated based on the map to include one or more upcoming streets as keys.

Next, in step 915, the command interpreter may determine whether any input from the voice recognition subsystem identifies a street name, vStreet. For example, the command interpreter may compare each detected voice phrase to the upcoming streets on the map or may search for keywords such as "street," "avenue," or "road" to locate street identifications among the detected voice phrases. If such a street identification is identified, the command interpreter increase the confidence in the results table associated with that street by the confidence level reported by the voice recognition subsystem for that phrase.

In step 925, the command interpreter determines whether the gesture recognition subsystem detected any pointing gestures. If so, the command interpreter, in step 930 uses the direction of the pointing gesture along with the surrounding map information to identify the street to which the gesture points, gStreet. Then, in step 935, the command interpreter updates the table to incorporate the confidence value assigned to the gesture by the gesture recognition subsystem into the confidence value associated with the pointed-to street.

Next in step 940, the command interpreter determines whether the voice input additionally identifies any environmental variables. For example, the voice input may reference a landmark or another vehicle on the road. If so, the command interpreter proceeds to, in step 945, identify the street near the reference using the map, the indicated reference, and the environmental model. For example, where the voice input identified "that tree," "the blue car," or "the Civic to my left," the command interpreter will search the environment model for corresponding objects and then cross reference their locations with the map to identify the nearby street(s). The command interpreter then in step 950, increases the confidence associated with the nearby street according to the average of the voice recognition subsystem's confidence in the environment reference having been spoken and the environment sensing and modeling subsystem's confidence in the accuracy of the environment model. After considering all the anticipated inputs and updating the table, the method 900, in step 955, returned the results table for use by another process and proceeds to end in step 960.

It will be appreciated that each of the decision steps may be used to identify and update the table for multiple streets. For example, a gesture may generally point toward multiple streets or multiple environment references may be provided. Additionally, it will be understood that the method 900 may be expanded to consider additional inputs from the same or additional input sources and adapted for use in other methods for determining other parameter types.

As noted above, the systems and features described herein may be incorporated into many different applications such as autonomous vehicle control or information display on a HUD. In the case of autonomous vehicle control instructions, may be given to the control subsystems such as "turn left there," "follow that blue car," "take me on a scenic route," or "give me manual control of the car," or virtually any other command. In the case of information display on a HUD, passenger assistance may interpreted and presented in the field of view of the driver, alleviating the need for the driver to divert attention away from the road to the passenger to fully understand what is being said. For example, if the passenger says "follow that blue car," the command interpreter may instruct the HUD to place a highlight on the blue car. As another example, if the passenger says "turn right there" and points to a road, the command interpreter may instruct the HUD to place a "turn arrow" graphic on the ground at the road to which the passenger gestured. It will be apparent that in various embodiments, such functionality may be at least partially implemented in a separate passenger assistance subsystem that, in turn, controls the HUD subsystem to display the desired graphics.

Various additional applications will be apparent. For example, the command interpreter may be used in conjunction with a network-enabled information discovery subsystem. In such embodiments, the user may issue queries about the surrounding environment such as, for example, "what is that building over there," "show me the restaurants near me," or "find me the closest gas station." The command interpreter would then behave in any of the manners described above to issue appropriate instructions to the information discovery subsystem. The information discovery subsystem could then process the instructions according to any appropriate method. For example, if the command interpreter provides an instruction to identify a building at a particular location (e.g., as interpreted from a voice command "what is that," a gesture toward the building, and the environment model), the command interpreter may query a database or service to retrieve information about the building and display the information via the HUD. As another example, the command interpreter may issue a command to identify businesses of the type "restaurant" near the current vehicle location (as determined using the map or GPS subsystem). The information discovery may then again issue a query to a local or remote database or other service to retrieve the requested information. In some embodiments, this instruction may be implemented as a substep for the command interpreter and the information discovery subsystem may provide the retrieved information back to the command interpreter. The command interpreter then may interpret this additional information along with the initial command, and the environment model to issue instructions to the HUD to highlight the buildings in the returned list and display information describing the buildings such as, for example, restaurant name, distance, and hours of operation. Various additional modifications will be apparent.

In some embodiments, the command interpreter may use, or be used by other subsystems, to communicate back to the user. For example, when the command interpreter issues an instruction, the command interpreter may output a confirmation message to the user. Further, such confirmation message may utilize additional context information. For example, where the user says "turn left there," the command interpreter may issue an instruction to the autonomous control subsystem to turn left onto a specified road. Around the same time, the command interpreter or the autonomous control subsystem, via the command interpreter, may output an audio or visual message such as "Ok, I will turn onto Elm Street." Alternatively or additionally, such environmental or other contextual cues may be used in clarification requests. For example, in response to the same exemplary user command, the command interpreter may output an audio or visual request such as "did you want me to turn left where the blue car is parked or at the next street after that?" Various additional modifications for implementing such functionality will be apparent in view of the foregoing.

Various additional features for incorporation into the command interpreter will be apparent. For example, in some embodiments, the command interpreter may be able to differentiate between a driver and a passenger or between multiple passengers based on, for example, voice identification or locating the source of a voice input or gesture. Such information may be used, for example, to accept commands only from a driver or to only analyze input from a single user at a time (e.g., if passenger A says "turn over there," ignore any gestures or speech from passenger B). In some embodiments, the command interpreter may operate according to a mode where only a driver may issue commands and alternatively according to a mode where passengers may also issue commands. In some embodiments, the command interpreter may ignore specific speech patterns. For example, the command interpreter may recognize some speech and gestures as originating from child passengers and consequently ignore any such commands. As another example, the command interpreter may associated different voices with permissions to operate the vehicle and ignore any commands that are issued by a passenger that is not permitted to issue such a command. For example, to prevent theft, the command interpreter may ignore all commands or all commands to the autonomous control subsystem if the voice or image data does not correlate to any registered or otherwise known passengers.

According to the foregoing, various embodiments enable a flexible and extensible method and system for interpreting user commands in view of all available information to control various vehicle subsystems such as autonomous control subsystems and heads up display subsystems. For example, by interpreting voice commands along with gesture input and environmental models, commands that rely on non-verbal cues or environmental references can be accurately interpreted. Various additional benefits will be apparent in view of the foregoing.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A command interpreter of a vehicle control system comprising:
   a memory and a processor, the memory includes command interpretation instructions, the processor executes the command interpretation instructions, the command interpretation instructions include:
   receiving from at least one of a human vehicle driver and a human vehicle passenger via a first input device, a first input having a first input type;
   receiving a second input having a second input type different from the first input type via a second input device, wherein the second input type comprises at least one of sensed information describing a surrounding environment of the vehicle and input received from at least one of the human vehicle driver and the human vehicle passenger;
   interpreting both the first input and the second input to generate a system instruction, wherein interpreting both the first input and the second input to generate the system instruction includes correlating the first input and the second input to determine at least one instruction command, wherein upon determining the at least one instruction command, the processor retrieves metadata associated with the at least one instruction command and determines one or more parameter sets for the at least one instruction command based on the metadata,
   wherein the processor determines if a sufficient confidence level exists in the one or more parameter sets based on a vehicle state indicative of a current vibration level of a cabin of the vehicle received from a vehicle state sensing subsystem and the processor generates the system instruction based on the at least one instruction command and the one or more parameter sets in which the sufficient confidence level exists, wherein the system instruction includes a change lane command to move the vehicle to a lane associated with a vibration level lower than the current vibration level; and controlling an operation of an autonomous control system to control motion of the vehicle based on execution of the system instruction.

2. The command interpreter of claim 1, wherein interpreting both the first input and the second input to generate the system instruction includes:
upon determining the at least one instruction command the processor analyzes the at least one instruction command to determine an instruction command that includes a sufficient confidence level that represents an intention of the at least one of the human vehicle driver and the human passenger, wherein upon determining that the at least one instruction command does not include the sufficient confidence level, a request for command clarification is output.

3. The command interpreter of claim 1, wherein interpreting both the first input and the second input to generate the system instruction includes upon determining that the sufficient confidence level does not exist in the one or more parameter sets, a request for parameter clarification is output.

4. The command interpreter of claim 1, wherein, interpreting both the first input and the second input to generate the system instruction includes, utilizing the second input to select from a plurality of potential instructions identified as being associated with the first input.

5. The command interpreter of claim 1, wherein the processor utilizes machine learning to generate a plurality of rules.

6. The command interpreter of claim 1, wherein:
the second input device is a camera; the processor receives the second input from a gesture recognition system; and the second input describes a gesture performed by the at least one of the human vehicle driver and the human vehicle passenger,
wherein the processor determines the at least one instruction command based on a correlation of the first input and the gesture performed by the at least one of the human vehicle driver and the human vehicle passenger and retrieving metadata associated with the at least one instruction command to determine the one or more parameter sets for the instruction command based on the metadata.

7. The command interpreter of claim 1, wherein:
the processor receives the second input from an environment sensing system that identifies objects present in the environment outside of the vehicle; and the second input describes at least one object present in the environment outside the vehicle.

8. The command interpreter of claim 1, wherein the system instruction is associated with at least one parameter, wherein the at least one parameter is based on a correlation of the first input, the second input, and the one or more parameter sets, wherein the at least one parameter defines an action associated with the system instruction to be performed by the autonomous control system.

9. The command interpreter of claim 1, wherein the system instruction indicates a tactical maneuver for the autonomous control system to perform.

10. The command interpreter of claim 1, further including controlling an operation of a heads-up-display positioned for viewing by at least one of the human vehicle driver and the human vehicle passenger and the system instruction is associated with a graphic to be displayed via the heads-up-display.

11. A vehicle interaction system comprising:
a first input system that receives a first input having a first input type from at least one of a human vehicle driver and a human passenger;
a second input system that receives a second input having a second input type that is different from the first input type, wherein the second input type comprises sensed information describing a surrounding environment of a vehicle and input received from at least one of the human vehicle driver and the human passenger;
a storage device that stores the first input, the second input, and command interpretation instructions;
an output system that accepts instructions from other systems;
a command interpreter that executes the command interpretation instructions that include:
obtaining the first input and the second input stored in the storage device,
interpreting both the first input and the second input to generate a system instruction, wherein interpreting both the first input and the second input to generate the system instruction includes correlating the first input and the second input to determine at least one instruction command, wherein upon determining the at least one instruction command the command interpreter retrieves metadata associated with the at least one instruction command and determines one or more parameter sets for the at least one instruction command based on the metadata,
wherein the command interpreter determines if a sufficient confidence level exists in the one or more parameter sets based on a vehicle state indicative of a current vibration level of a cabin of the vehicle received from a vehicle state sensing subsystem and the command interpreter generates the system instruction based on the at least one instruction command and the one or more parameter sets in which the sufficient confidence level exists, wherein the system instruction includes a change lane command to move the vehicle to a lane associated with a vibration level lower than the current vibration level, and
controlling an operation of an autonomous control system to control motion of the vehicle based on execution of the system instruction.

12. The command interpreter of claim 11, wherein, in interpreting both the first input and the second input to generate the system instruction, the command interpreter:
analyzes the at least one instruction command to determine an instruction command that includes a sufficient confidence level that represents an intention of the at least one of the human vehicle driver and the human passenger upon determining the at least one instruction command, wherein the command interpreter outputs a request for command clarification is output upon determining that the at least one instruction command does not include the sufficient confidence level.

13. The vehicle interaction system of claim 11, wherein the system instruction includes a command and at least one parameter and, in interpreting both the first input and the second input to generate the system instruction, the command interpreter:
outputs a request for parameter clarification upon determining that the sufficient confidence level does not exist in the one or more parameter sets.

14. The vehicle interaction system of claim 11, wherein, in interpreting both the first input and the second input to generate the system instruction, the command interpreter utilizes the second input to select from a plurality of potential instructions identified as being associated with the first input.

15. The vehicle interaction system of claim 11, wherein, in interpreting both the first input and the second input to generate the system instruction, the command interpreter evaluates at least one rule of a plurality of rules correlating various inputs to various system instructions.

16. The vehicle interaction system of claim 15, wherein the command interpreter utilizes machine learning to generate the plurality of rules.

17. The vehicle interaction system of claim 11, wherein:
the second input system is a gesture recognition system;
the second input describes a gesture performed by the at least one of the human vehicle driver and the human passenger,
wherein the command interpreter determines the at least one instruction command based on a correlation of the first input and the gesture performed by the at least one of the human vehicle driver and the human passenger and retrieving metadata associated with the at least one instruction command to determine the one or more parameter sets for the instruction command based on the metadata.

18. The vehicle interaction system of claim 11, wherein:
the second input system is an environment sensing system that identifies objects present in the environment outside of the vehicle; and
the second input describes at least one object present in the environment outside the vehicle.

19. The vehicle interaction system of claim 11, wherein the system instruction is associated with at least one parameter, wherein the at least one parameter is based on a correlation of the first input, the second input, and the one or more parameter sets, wherein the at least one parameter defines an action associated with the system instruction to be performed by the autonomous control system.

* * * * *